(No Model.)

R. S. T. CISSEL.
DAMPER.

No. 349,921. Patented Sept. 28, 1886.

WITNESSES:

INVENTOR
Richard S. T. Cissel.
BY
Francis C. Bowen
ATTORNEY

UNITED STATES PATENT OFFICE.

RICHARD S. T. CISSEL, OF ELIZABETH, NEW JERSEY.

DAMPER.

SPECIFICATION forming part of Letters Patent No. 349,921, dated September 28, 1886.

Application filed November 9, 1885. Serial No. 182,225. (No model.)

*To all whom it may concern:*

Be it known that I, RICHARD S. T. CISSEL, a citizen of the United States, and a resident of Elizabeth, in the county of Union and State of New Jersey, have invented certain new and useful Improvements in Dampers, of which the following is a specification.

This invention relates to improvements in dampers such as are used in connection with furnaces for regulating the draft of air for use in buildings and for other similar purposes; and it consists in the novel feature of construction hereinafter described, whereby I obtain a device which is adapted to be passed through an aperture having a diameter smaller than the diameter of the united damper, and to be mounted in the desired structure, as hereinafter more particularly described, and set forth in the accompanying drawings, in which—

Figure 1:
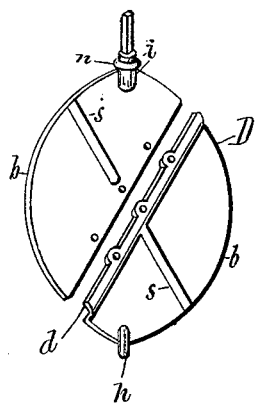
Figure 2:
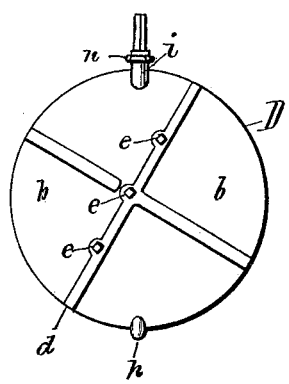
Figure 3:
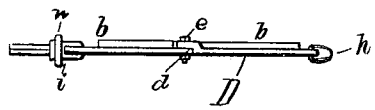

Figure 1 is a perspective view showing the damper divided. Fig. 2 is a side view. Fig. 3 is an edge view.

Similar letters of reference indicate similar parts.

The letter D designates the damper, and $b\ b$ the two semicircular halves, having lap-joints $d$ at their diameters, and which are secured together by bolts. Each half of the damper is strengthened by a radial rib, $s$, cast with it at a right angle with its straight edge.

On the bottom of one of the halves of the damper is a teat, $h$, for engagement with a socket on the interior of the globe portion of a radiator, forming the lower axis of the damper, and on the opposite edge of the other half of the damper is formed a shaft, $i$, which passes through a hole in the globe of the radiator, and which forms the upper axis of the damper. This shaft may be provided with a key or thumb-piece to facilitate the turning of the damper. It is also provided with a bead or flange, $n$, to make a tight joint with the opening in the radiator.

This invention I intend for general use; but it is more particularly adapted for use in connection with my improved radiator for which I have applied for Letters Patent. As the globe of that radiator is cast in one piece, and its diameter is greater than that of the pipe-holes, I make the damper D in two sections and secure them together after passing them through the pipe-hole into the globe, thereby providing a damper adapted to be passed through an aperture having a diameter less than the diameter of the damper when the parts are united.

What I claim as new, and desire to secure by Letters Patent, is—

1. A damper consisting of two semicircular parts secured together by lap-joints and bolts, one of said parts being provided with a teat to form its lower axis, and the other part provided with a shaft to form its upper axis, substantially as herein described.

2. A damper, D, made in two semicircular parts having radial arms $s$, secured together by lap-joints and bolts, one of said parts being provided with a teat to form its lower axis, and the other part provided with a shaft to form its upper axis, substantially as herein described.

Signed at New York, in the county of New York and State of New York, this 7th day of November, A. D. 1885.

RICHARD S. T. CISSEL.

Witnesses:
JAS. S. EWBANK,
FRANCIS C. BOWEN.